United States Patent [19]

Webster et al.

[11] Patent Number: 5,673,457

[45] Date of Patent: Oct. 7, 1997

[54] DEBRIS BLOWER AND/OR VACUUM DEVICES

[75] Inventors: Craig Webster, Jesmond; John Sadler, Darlington, both of United Kingdom

[73] Assignee: Black & Decker Inc., Newark, Del.

[21] Appl. No.: 594,113

[22] Filed: Jan. 30, 1996

[30] Foreign Application Priority Data

Jan. 30, 1995 [GB] United Kingdom ............... 9501751

[51] Int. Cl.⁶ .................................................. A47L 5/24
[52] U.S. Cl. ........................ 15/330; 15/344; 15/405; 15/409
[58] Field of Search ............................ 15/344, 405, 330, 15/409

[56] References Cited

U.S. PATENT DOCUMENTS

| 3,968,938 | 7/1976 | Ruhl et al. ............... 15/330 X |
| 4,187,577 | 2/1980 | Hansen et al. ............ 15/405 X |
| 4,227,280 | 10/1980 | Comer .................... 15/405 X |
| 4,237,576 | 12/1980 | Stakes ..................... 15/405 X |
| 4,242,794 | 1/1981 | Peterson .................. 15/405 X |
| 4,644,606 | 2/1987 | Luerken et al. . |
| 4,694,528 | 9/1987 | Comer et al. ............. 15/405 X |
| 5,222,275 | 6/1993 | Baker et al. . |
| 5,245,726 | 9/1993 | Rote et al. . |
| 5,477,588 | 12/1995 | Iida et al. ................. 15/405 |
| 5,511,281 | 4/1996 | Webster ................... 15/339 X |

FOREIGN PATENT DOCUMENTS

| 0008117 | 2/1980 | European Pat. Off. . |
| 0198654 | 1/1991 | European Pat. Off. . |
| 0443882 | 8/1991 | European Pat. Off. . |
| 0524405 | 1/1993 | European Pat. Off. . |
| 0587272 | 3/1994 | European Pat. Off. . |
| 0599477 | 6/1994 | European Pat. Off. . |
| 0657587 | 6/1995 | European Pat. Off. . |
| 3836748 | 5/1989 | Germany . |
| 2282060 | 3/1995 | United Kingdom . |

Primary Examiner—Chris K. Moore
Attorney, Agent, or Firm—Charles E. Yocum; Kerry H. Owens

[57] ABSTRACT

A debris blower and/or vacuum device is disclosed which comprises a motor unit which drives an impeller. When the device is to be used as a blower, a volute arrangement adopted for blowing in which the impeller is locatable is releasably attached to the motor unit. The blower volute includes an air inlet and an air outlet duct for expelling a stream of air created by the impeller. When the device is to be used as a vacuum, a volute arrangement adapted for vacuuming in which the impeller is locatable is releasably attached to the motor unit. The vacuum volute includes a suction duct for transporting debris to the impeller in an airstream created by the impeller and an air expelling duct for transporting debris away from the impeller in the stream of air to a collecting location.

3 Claims, 4 Drawing Sheets

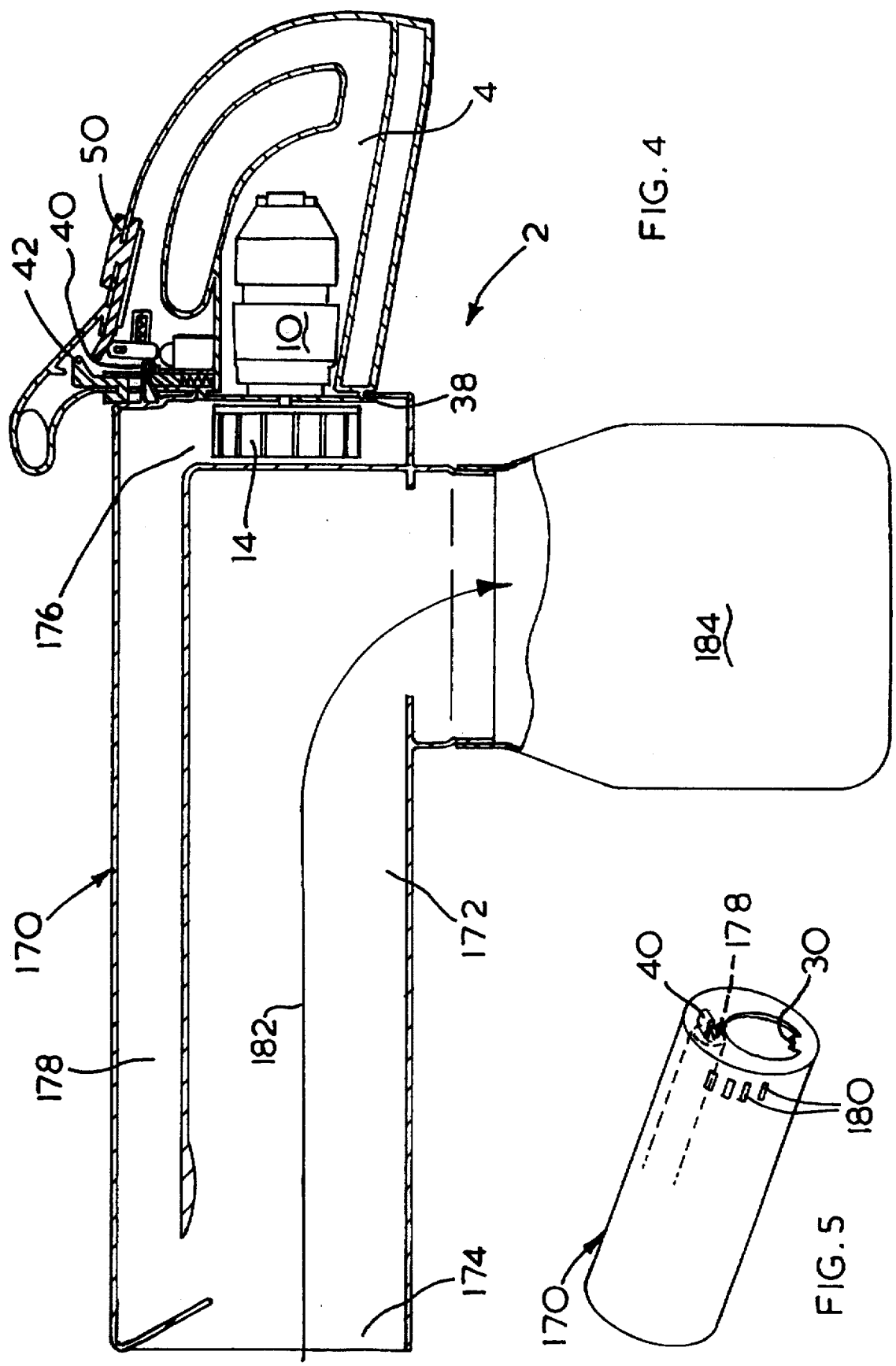

DEBRIS BLOWER AND/OR VACUUM DEVICES

The present invention relates to debris blower and/or vacuum devices in particular for use in the collection of garden debris.

Debris blowers are known in which an impeller driven by a motor creates an air stream which is directed down a duct. The air stream discharged from the open end of the duct is used to blow debris into piles.

Similarly debris vacuums are known of similar design in which the impeller creates a suction air flow through a duct. The suction at the open end of the duct sucks debris into the duct. The duct can be separated from the impeller by a filter and the debris collected before it reaches the impeller. Alternatively it is known for the debris to travel through the impeller to a collection point.

It is also known to provide a debris collecting device in which debris is sucked up at a collecting mouth of a collecting duct by an entrained stream of air. One or more air outlets are located adjacent to the collecting mouth from which air is expelled. This expelled air is directed up into the collecting duct and generates an entrained stream of air which carries the debris up the collecting duct to a collection point.

In many blower and/or vacuum devices it is difficult to clean the impeller and the impeller volute.

The object of the present invention is to provide debris blower and/or vacuum devices which overcome at least some of the problems discussed above.

According to a first aspect of the present invention there is provided a debris blowing and/or vacuum device comprising:
 a motor unit,
 an impeller which is drivable by the motor unit, and
 a volute in which the impeller is locatable including:
  an air inlet, and
  an air outlet,
 characterised in that the volute is releasably attachable to the motor unit.

The detachable volute makes the device easier to clean and maintain, in particular the impeller and the impeller volute.

For good blowing and suction results it is preferred that the volute is shaped so that the air stream generated by the impeller flows into the air inlet of the volute substantially along an axis on which the impeller is located and flows out of the air outlet of the volute radially from the impeller.

The volute may be specially designed so that it is a blower volute formed with an air outlet duct for expelling a stream of air generated by the impeller. The air expelled from this air outlet duct being used to blow debris into piles. When a volute is tailor made for blowing, a higher blowing air speed can, for example, be achieved from a particular size of motor.

The volute may be designed as a vacuum volute and include;
 a suction duct for transporting debris to the impeller in an air stream created by the impeller, and
 an air expelling duct for transporting debris away from the impeller in the air stream to a collecting point.

When a volute is tailor made for vacuuming mode only, a larger inlet to the impeller can be used, for example, which reduces the likelihood of debris blocking up the inlet.

Alternatively, the volute can be designed for both blowing and sucking, with the associated design compromises. When the device is used for blowing an air outlet duct for expelling a stream of air generated by the impeller can be releasably attached over the outlet duct. When the device is used for sucking a suction duct can be releasably attached over the air inlet for transporting debris to the impeller in an air stream created by the impeller and an air expelling duct can be attached for transporting debris away from the impeller in the air stream to a collecting point.

According to a second aspect of the present invention there is provided a blower/vacuum device comprising:
 a motor unit,
 an impeller which is drivable by the motor unit,
 a blower volute which is releasably attachable to the motor unit and in which the impeller is locatable including:
  an air inlet, and
  an air outlet duct for expelling a stream of air generated by the impeller,
 and a vacuum volute which is releasably attachable to the motor unit and in which the impeller is locatable including:
  a suction duct for transporting debris to the impeller in an air stream created by the impeller, and
  an air expelling duct for transporting debris away from the impeller in the air stream to a collecting point,
 characterised in that the blower volute and the vacuum volute are interchangeable.

Again the blower/vacuum device has the advantages of improved cleaning and maintenance. Additionally, the interchangeability of the blower volute and the vacuum volute allows each volute to be especially adapted for either blowing and/or sucking. Therefore the blower/vacuum device according to the second aspect of the present invention can be designed to work efficiently in both modes. This increase in efficiency will give better blowing and suction results and may enable a smaller motor to be used to power the impeller.

Also the interchangeability of the blower volute and the vacuum volute allows the outlet duct of the blower volute and the suction duct of the vacuum volute to be positioned relative to a handle arrangement for the device so that it is ergonomic in use as a blower and as a vacuum.

In order to tune the air flow out of the outlet duct of the blower volute it is preferred that the area of the air inlet in the blower volute is variable. This air flow tuning enables a user to alter the blowing air speed of the device.

To reduce the space required to store the blower volute preferably the outlet duct of the blower volute is of reduced length and the device additionally comprises an extension tube which is adapted at one end to be releasably attachable to the end of the outlet duct remote from the impeller.

A porous collecting bag may be releasably locatable on the end of the expelling duct remote from the impeller in order to collect expelled debris. Additionally, to reduce the space required to store the vacuum volute the suction duct can be of reduced length and the device may additionally comprise an extension tube which is adapted at one end to be releasably attachable to the end of the suction duct remote from the impeller.

For safety reasons the device may additionally comprise a safety mechanism which prevents the blower and/or vacuum volute from being detached from the motor unit when the device is in use.

A further advantage of the blower vacuum according to the present invention is that the motor unit and impeller arrangement can be used for other purposes when an volute is not attached to it. For example, a clean fan volute attachment can be attached to the motor unit and impeller arrangement in place of the blower and/or vacuum volute to make the device into a so called "clean fan" blower vacuum.

Therefore, according to a third aspect of the present invention there is provided a debris blowing and/or vacuum device comprising:

a motor unit, an impeller which is drivable by the motor unit, and a clean fan volute in which the impeller is locatable, including:

a suction duct having a working end into which debris is sucked, an air outlet which communicates with the suction duct near to said working end to create an entrained air stream in said suction duct, and an air inlet, characterised in that the clean fan volute is releasably attachable to the motor unit.

Alternatively, the motor unit and impeller arrangement can be attached over a collection receptacle, such as, a dustbin. The impeller can be arranged to draw air into the collection receptacle via a flexible tube. This airflow will entrain debris so that debris can be deposited directly into the collection receptacle through the flexible tube when the end of the tube is located over piles of garden debris.

It should be noted that the motor unit and impeller arrangement can be utilised to collect debris, to blow debris and to mulch debris (as debris passes through the impeller). Therefore, the motor unit and impeller arrangement could have additional uses to those discussed above.

The invention will now be further described with reference to the accompanying drawings in which:

FIG. 4 is a longitudinal cross section of a blower and/or vacuum device having attached to it a clean fan volute according to the present invention.

FIG. 5 is a perspective view of the clean fan volute which is shown in FIG. 4.

Figure 1:
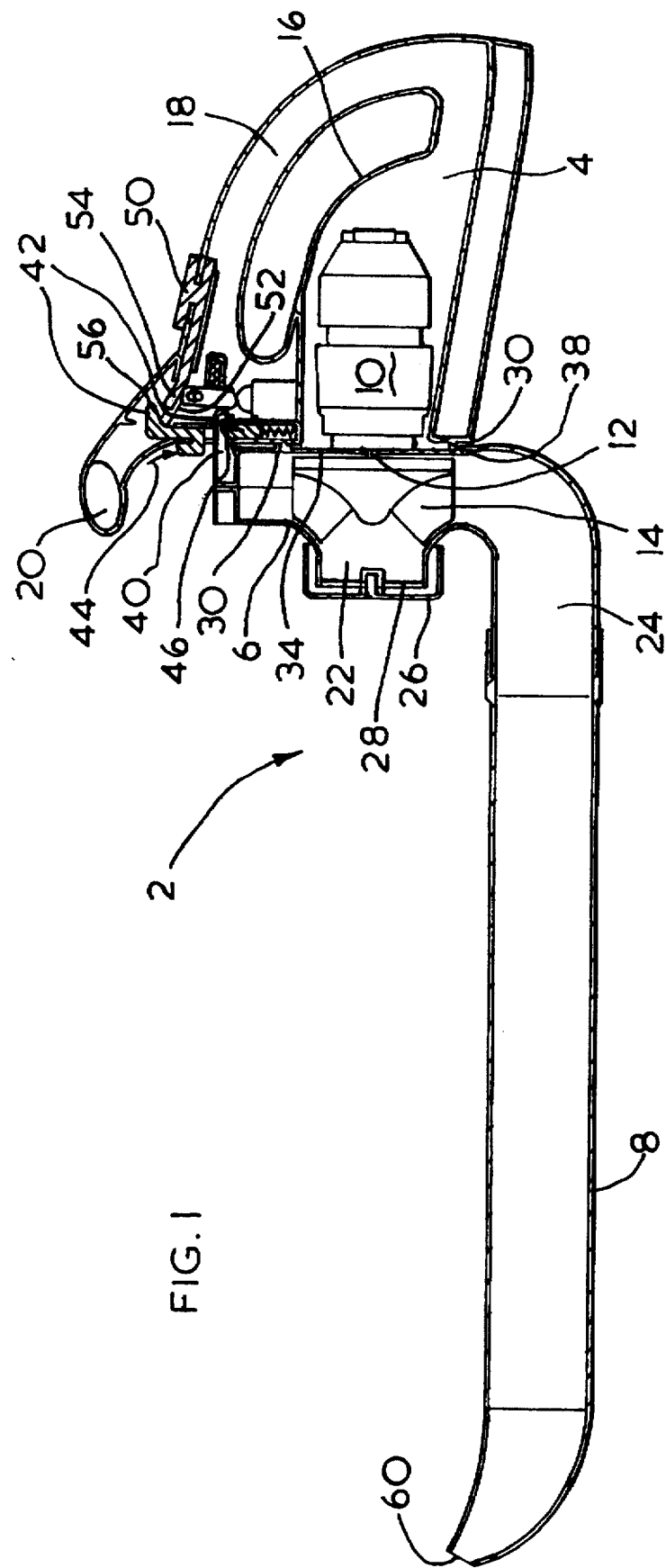
FIG. 1 is a longitudinal cross section of a device according to the present invention with a blower volute attached to a motor unit.

As can be seen from FIG. 1, the device shown generally at (2) comprises a motor unit (4), a blower volute (6) and an extension tube (8).

The motor unit (4) comprises a motor (10) which drives a drive shaft (12) which drives an impeller (14). The motor (10) is located within a motor housing (16) which includes a handle arrangement (18,20).

The blower volute (6) comprises an air inlet (22) and an air outlet duct (24). The blower volute (6) is shaped so that the impeller (14) is locatable within it and will in use expel air radially into the outlet duct (24). The outlet duct (24) bends through 90° so that the end of the outlet duct remote from the impeller (14) faces away from the motor unit (4).

A cap (26) is rotatably mounted over the air inlet (22). By rotating the cap (26), holes in the cap (26) can be aligned with holes in an air inlet cover (28) in order to vary the surface area through which air can flow into the inlet (22). In this way the volume of air flow through the impeller can be varied in order to vary the power of the blower device (2).

The blower volute (6) is releasably attachable to the motor unit (4). The blower volute has a hole defined by the rim (30) which fits over a co-operating portion (34) of the motor housing (16) through which the drive shaft 12 protrudes. The blower volute (6) is attachable to the motor unit (4) by means of a flange (38) in the co-operating portion in which the rim portion (30) is locatable and a releasable locking mechanism (40,42).

The locking mechanism comprises a flanged extension (40) of the blower volute (6) and a catch (42). The catch (42) is resiliently biased in a locked position shown in FIG. 1 in which it secures the flanged extension (40). When the catch (42) is depressed by a user applying a force in the direction shown by the arrow (44), a chamfered portion (46) of the catch (42) is released from the flanged extension (40) allowing the blower volute (6) to be detached from the motor unit (4).

A safety mechanism prevents the blower volute (6) being detached from the motor unit (4) while the motor (10) is running. The motor (10) is switched on by a user moving the switch (50) into a "forward" position shown by the line (52) in FIG. 1. The switch (50) has an extension (54) which engages with a lip (56) on the catch (42) when the switch is in the "forward" position. This engagement between the switch extension (54) and the lip (56) prevents depression of the catch (42) and thus prevents removal of the blower volute (6) while the motor (10) is rotating the impeller (14). When the motor (10) is switched off by moving the switch (50), the switch extension (154) is disengaged from the lip (56) and the catch (42) can be depressed to remove the blower volute (6) from the motor unit.

An extension tube (8) is releasably attachable to the end of the outlet duct (24) remote from the impeller (14).

In use of the device (2) shown in FIG. 1 the switch (50) is moved into the "forward" position to start the motor (10). The switch extension (54) engages the lip (56) of the catch (42), thus preventing removal of the blower volute (6). The motor (10) powers the drive shaft (12) which rotates the impeller (14). The rotation of the impeller (14) sucks air into the blower volute (6) through the air inlet (22) and expels air radially into the outlet duct (24). The air expelled into the outlet duct (24) flows along the duct (24) and through the extension tube (8) and out of the nozzle (60).

The air expelled from the nozzle (60) is used to blow debris.

Figure 2:
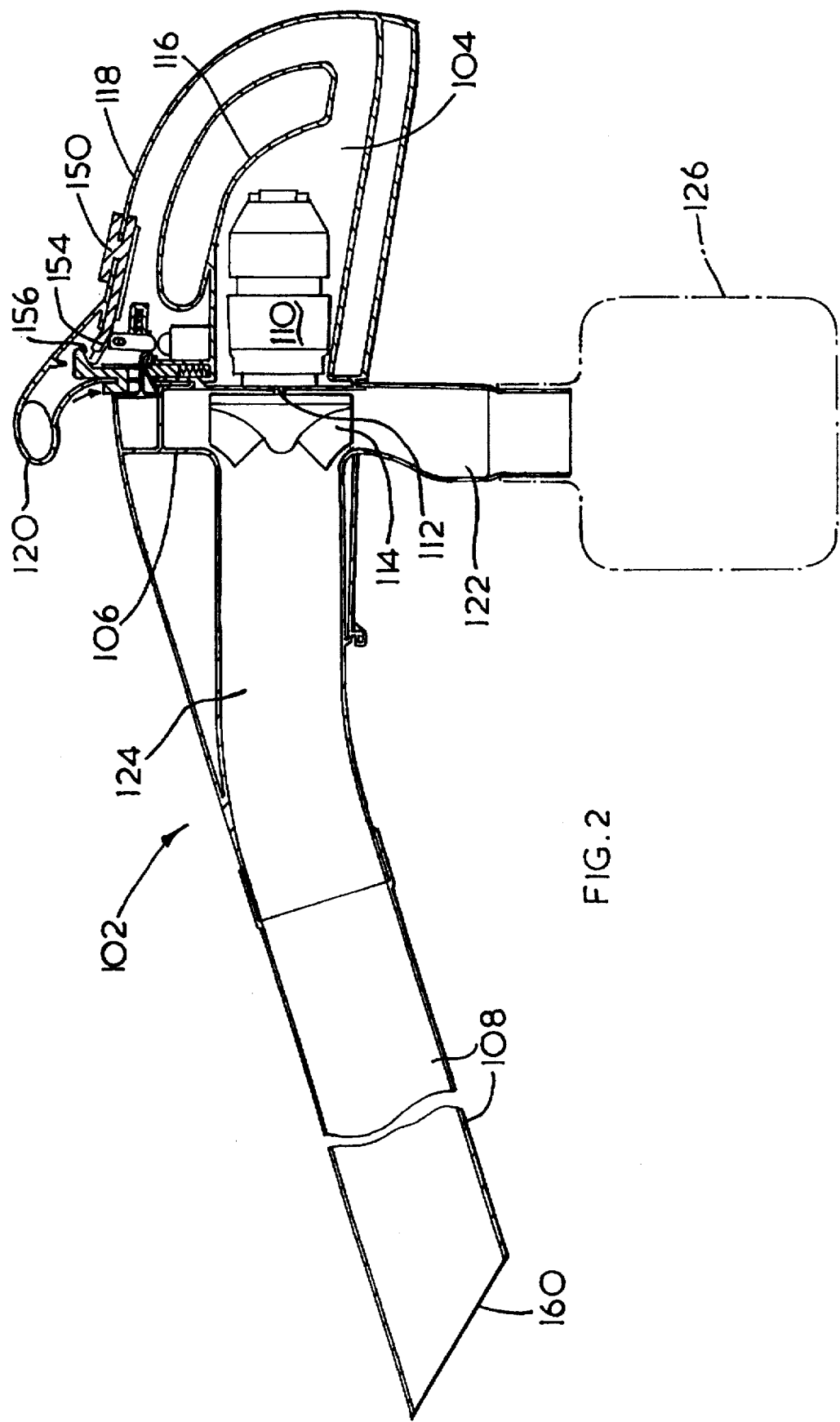
FIG. 2 is a longitudinal cross section of a device according to the present invention with a vacuum volute attached to a motor unit.

Referring now to FIG. 2, the device shown generally at (102) comprises a motor unit (104), a vacuum volute (106) and an extension tube (108).

The motor unit (104) comprises a motor (110) which drives a drive shaft (112) which drives an impeller (114). The motor (110) is located within a motor housing (116) which includes a handle arrangement (118,120).

The vacuum volute (106) comprises a suction duct (124) and an expelling duct (122). The vacuum volute (106) is shaped so that the impeller (114) is locatable within it and will, in use, draw air axially into the impeller (114) through the suction duct (124) and expel air radially into the expelling duct (122).

A porous collecting bag (126) is releasably attachable to the end of the expelling duct (122) distant from the impeller (114).

The vacuum volute (106) is releasably attachable to the motor unit (104) by the locking mechanism described above in relation to FIG. 1. The same mechanism as described above in relation to FIG. 1 is also used to prevent the vacuum volute (106) being removed from the motor unit (104) while the motor (110) is rotating the impeller (114).

An extension tube (108) is releasably attachable to the end of the suction duct (124) remote from the impeller (114).

In use of the device (102) shown in FIG. 2 the switch (150) is moved to the "forward" position to start the motor (110). The switch extension (154) engages the lip (156) of the catch (142), thus preventing removal of the vacuum volute (106). The motor (110) powers the drive shaft (112) which rotates the impeller (114). The rotation of the impeller (114) sucks air and debris into the vacuum volute (106), axially, through the suction mouth (160) of the extension tube (180) and then through the suction duct (124). The air and debris is sucked through the impeller (114) and is expelled through the expelling duct (122) into the collecting bag (126). The porous collecting bag (126) collects debris transported by the air flow but allows the air to escape.

Figure 3:
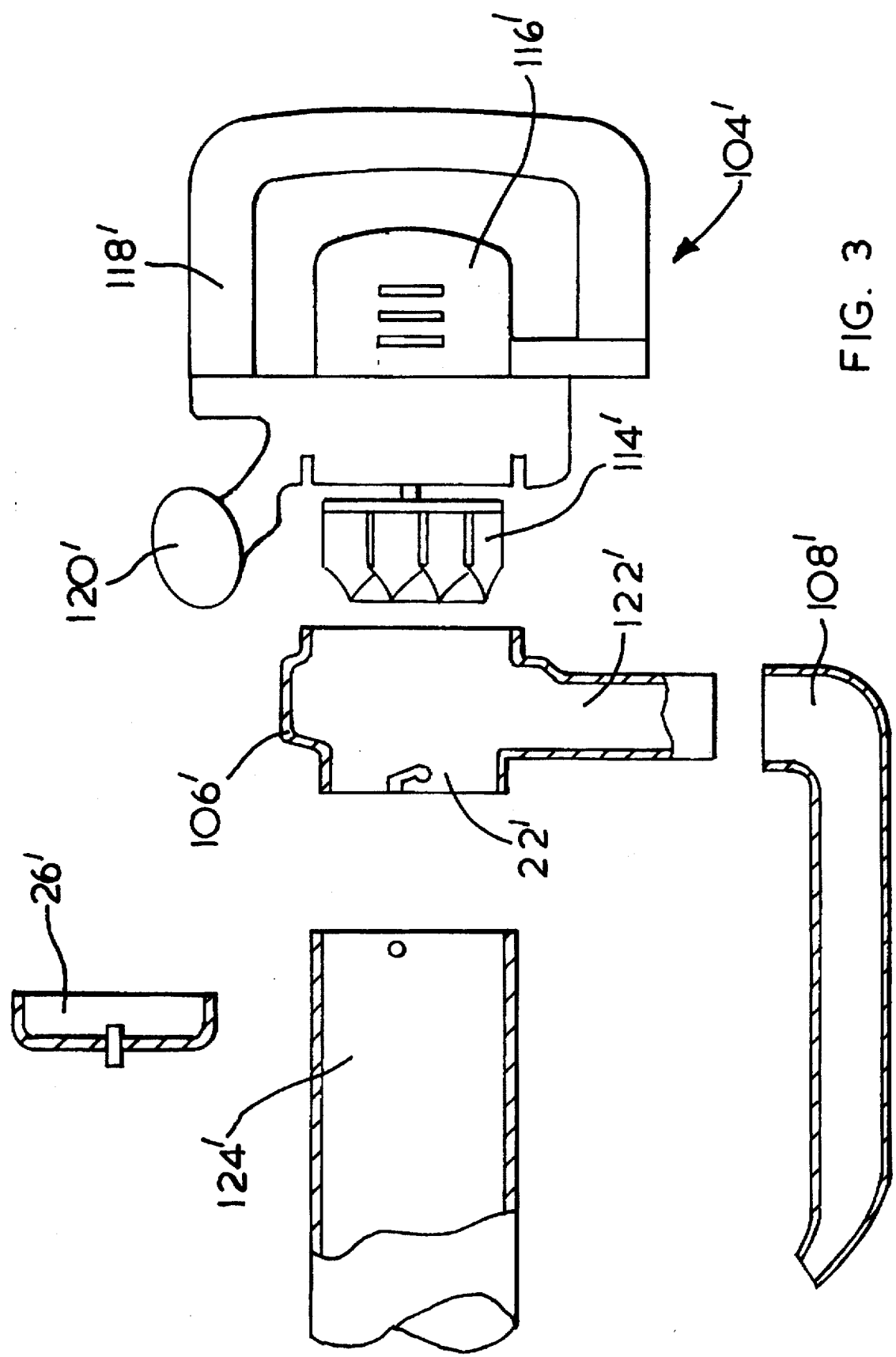
FIG. 3 is a partial cross section of a blower and/or vacuum device according to the present invention.

FIG. 3 shows a device similar to that described above in relation to FIGS. 1 and 2. The volute (106') has an air inlet (22') and an air outlet duct (122') and is releasably attachable to the motor unit (104').

When the device of FIG. 3 is to be used as a blower a cap (26') similar to the cap (26) of FIG. 1 is releasably attached over the air inlet (22') and an air outlet extension (108') is releasably attached over the air outlet (122'). Then the device works the same as the device described in relation to FIG. 1.

When the device of FIG. 3 is to be used as a vacuum, the cap (26') is replaced by a suction duct (124') which is releasably attached over the air inlet (22'). The air outlet extension (108') is replaced by a collecting bag (not shown) similar to the bag (126) shown in FIG. 2 which is releasably attached over the air outlet (122'). Then the device works the same as the device described in relation to FIG. 2.

Referring now to FIG. 4, this shows a motor unit (4) and impeller arrangement (14) as described above in relation to FIG. 1. Attached to the motor unit and impeller arrangement is a clean fan volute (170) (also shown in perspective in FIG. 5). The clean fan volute (170) is attached to the motor unit (4) in the same way as the blower volute (6) described above in relation to FIG. 1 is attached to the motor unit (4).

The clean fan volute (170) includes a suction duct (172) with a working end (174) into which debris is sucked in use. It also includes an air outlet (176) which communicates via a duct (178) with the suction duct (172) near to the working end (174) thereof. Additionally, it includes an air inlet (180) (see FIG. 5) through which air is supplied to the impeller (14).

In use, when the impeller rotates air is drawn through the inlets (180) and is expelled by the impeller through the air outlet (176) and down the duct (178) from which it is directed into the suction duct (172). The airstream which is directed into the suction duct creates an entrained air flow (182) which draws debris into the working end (174) of the suction duct and carries it to a porous collecting bag (184).

What is claimed is:

1. A blower/vacuum device comprising:

a motor unit, an impeller which is drivable by the motor unit, a blower volute which is releasably attachable to the motor unit and in which the impeller is locatable including:

an air inlet, and an air outlet duct for expelling a stream of air generated by the impeller, and a vacuum volute which is releasably attachable to the motor unit and in which the impeller is locatable including:

a suction duct for transporting debris to the impeller in an air stream created by the impeller, and an air expelling duct for transporting debris away from the impeller in the air stream to a collecting point, characterised in that the blower volute and the vacuum volute are interchangeable.

2. A device according to claim 1 characterised in that a porous collecting bag is releasably locatable at the end of the expelling duct distant from the impeller.

3. A blower/vacuum device comprising:

a motor unit, an impeller which is drivable by the motor unit, and a clean fan volute within which the impeller is locatable, including:

a suction duct having a working end into which debris is sucked, an air outlet which communicates with the suction duct near to said working end to create an entrained air stream in said suction duct, and an air inlet, characterised in that the clean fan volute is releasably attachable to the motor unit.

* * * * *